United States Patent Office 2,697,085
Patented Dec. 14, 1954

2,697,085

POLYPEPTIDE-TRICHLOROACETIC ACID SPINNING SOLUTION

Clement Henry Bamford and William Edward Hanby, Maidenhead, England, assignors to Courtaulds Limited, London, England, a British company No Drawing. Application May 1, 1950, Serial No. 159,391

Claims priority, application Great Britain May 20, 1949

4 Claims. (Cl. 260—29.2)

This invention relates to the production of artificial fibres of polymeric compounds and particularly to the production of fibres of synthetic polypeptides by polymerising anhydrocarboxyamino-acids having the general formula:

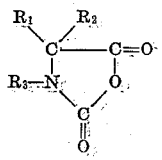

$R_1$, $R_2$ and $R_3$ being hydrogen atoms or alkyl, aryl or aralkyl groups, which may be substituted or unsubstituted.

H. Leuchs has already reported, in Berichte, vol. 41 (1908), page 1721, that glycine carbonic anhydride (in which $R_1$, $R_2$ and $R_3$ in the above formula are all H) can be polymerised by treatment with a small proportion of water either at room temperature or by heating, the polymerisation being accompanied by evolution of carbon dioxide. T. Curtius and W. Sieber, in Berichte, vol. 55 (1922), page 1543, reported that other anhydrocarboxy-amino-acids could be used, further specified examples being anhydrocarboxy-DL-α-amino-n-butyric acid and anhydrocarboxy-DL-phenylalanine. Wessely, in the Zeitschrift für Physiologische Chemie, vol. 146 (1925), page 172, reported that a base such as pyridine may also be used as an initiator for the polymerisation. R. B. Woodward and C. H. Schramm, in the Journal of the American Chemical Society, vol. 69 (1947), pages 1551–2, reported that synthetic polypeptides and copolymeric peptides may be obtained from one or more anhydrocarboxy-amino-acids having the general formula:

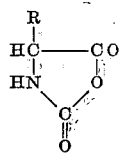

using as an initiator water or any substance XH, in which H is an active hydrogen atom; a copolymeric peptide from anhydrocarboxy-L-leucine and anhydrocarboxy-DL-phenylalanine using water as an initiator, is specifically described. W. T. Astbury, C. E. Dalgliesh, S. E. Darmon and G. B. B. M. Sutherland, following on the work of Woodward and Schramm, reported in Nature, vol. 162 (1948), No. 4120, pages 596–9, that they had prepared polypeptides from single amino acids and copolymers of two or more amino acids using a tertiary base as initiator; amino acids specified are glycine, sarcosine, DL-alanine, L-alanine, L-valine, DL-leucine, D-leucine, L-leucine, DL-isoleucine, D-isoleucine, L-isoleucine, DL-norleucine, DL-α-phenylglycine, DL-phenylalanine, L-phenylalanine and L-tyrosine.

It is the object of the present invention to produce fibres from synthetic polypeptides.

The present invention relates to the production of fibres from synthetic polypeptides and comprises a spinning solution of the polypeptide in a solvent consisting of or comprising a major proportion of a monohydric phenol, a lower aliphatic carboxylic acid, a halogen-substituted lower aliphatic acid or mixtures of these compounds. In the present invention, lower aliphatic acids are those containing from 1 to 5 carbon atoms.

Suitable monohydric phenols for use as solvents are phenol and the cresols, for example meta cresol; suitable carboxylic acids and halogen-substituted acids are formic acid, dichloracetic acid and trichloracetic acid. Mixtures of these compounds may also be used, for example a mixture of 3 parts by weight of trichloracetic acid and 1 part by weight of dichloracetic acid. The solvents or solvent mixtures may also contain proportions of diluents which, although not strictly solvents for the polypeptides, do not act as coagulants in the proportions used. Examples of such diluents are water, benzene and chloroform.

The polypeptide solutions are preferably wet spun although they may be dry spun if desired, for example into hot air. For wet spinning, the preferred coagulants are hydroxyl-containing compounds such as water, the lower alcohols, for example methyl alcohol and ethyl alcohol, and aqueous solutions of such alcohols; other coagulants, for example ether or petroleum ether, may also be used alone or in conjunction with a lower alcohol.

The concentration of the polypeptide solution is not critical and solutions containing from 5 to 15 per cent by weight of polypeptide have been extruded satisfactorily.

The solution of the polypeptide may be heated to a temperature higher than that of the non-solvent precipitating bath.

Fibres obtained by the process according to the invention using formic acid as solvent generally have a β configuration whereas fibres obtained using phenols, dichloracetic acid and tri-chloracetic acid as solvents generally have an α configuration. The polypeptides used in the present invention are preferably those obtained according to the process described in application Serial No. 159,392 of even date and now Patent No. 2,598,372.

The present invention is illustrated by the following examples in which percentages are by weight:

Example 1

$\frac{1}{100}$ mol of anhydrocarboxy-DL-β-phenylalanine and $\frac{1}{100}$ mol of the gamma-methyl ester of anhydrocarboxy-L-glutamic acid were dissolved in purified nitrobenzene containing $\frac{1}{20,000}$ mol of N-(aminoacetyl)-dimethylamine as polymerisation initiator. After standing 15 days at 50° centigrade the resultant gel was triturated with petroleum ether and the solid precipitate was filtered off, washed thoroughly with petroleum ether to remove nitrobenzene and dried in air.

The synthetic copolymeric peptide produced was dissolved in meta-cresol to form a 15 per cent solution. The solution was then extruded at ordinary temperature (20° centigrade) into a bath of ethyl alcohol. The fibres so produced were withdrawn from the bath, passed through a drier and collected continuously.

Example 2

$\frac{1}{50}$ mol of anhydrocarboxy-DL-β-phenylalanine was added to purified nitrobenzene (10 cubic centimetres) containing $\frac{1}{20,000}$ mol of N-(α-amino-β-phenyl-propionyl)-dimethylamine. After 3 days at 50° centigrade the polymer was precipitated with petrol, washed with petrol and dried.

The synthetic polypeptide was dissolved in metacresol at 50° centigrade to form a 15 per cent solution. The solution was heated to 70° centigrade and extruded into a bath of ethyl alcohol at ordinary temperature (approximately 20° centigrade). The fibres so produced were withdrawn from the bath, passed through a drier and collected continuously.

Example 3

A copolymer of DL-β-phenylalanine with the gamma-methyl ester of L-glutamic acid prepared as described in Example 1 was dissolved in formic acid to form a 15 per cent solution. The solution was then extruded at ordinary temperature (20° centigrade) into a bath of water. The fibres so produced were withdrawn from the bath, passed through a drier and collected continuously.

Example 4

A copolymer of DL-β-phenylalanine with α-aminoisobutyric acid prepared from 1/100 mol of anhydrocarboxy-DL-β-phenylalanine and 1/100 mol of anhydrocarboxy-α-aminoisobutyric acid and 1/20,000 mol of N-(aminoacetyl)-dimethylamine as described in application Serial No. 159,392 of even date was dissolved in a mixture of 90 per cent by weight of trichloracetic acid and 10 per cent by weight of water to form a 15 per cent solution. The solution was then extruded at ordinary temperature (20° centigrade) into water, alcohol or a mixture of equal parts of water and alcohol. The fibres so produced were withdrawn from the bath, passed through a drier and collected continuously.

Example 5

The polymeric DL-β-phenylalanine used in Example 2 was dissolved in dichloracetic acid to form a 15 per cent solution. The solution was then extruded at ordinary temperature (20° centigrade) into a bath of water. The fibres so produced were withdrawn from the bath, passed through a drier and collected continuously.

Example 6

A copolymer of 3 parts by weight of DL-β-phenylalanine and 1 part by weight of glycine prepared by the method described in application Serial No. 159,392 using N-(aminoacetyl)-dimethylamine as initiator was dissolved in meta-cresol to form a 5 per cent solution and the solution was extruded at 20° centigrade into a bath containing a mixture of equal volumes of ether and ethyl alcohol. The fibres so produced were withdrawn from the bath, passed through a drier and collected continuously.

Example 7

The copolymer used in Example 1 was dissolved in a mixture of 90 per cent of phenol and 10 per cent of water to form a 10 per cent solution and the solution was extruded at 20° centigrade into a bath of methyl alcohol. The fibres so produced were withdrawn from the bath, passed through a drier and collected continuously.

Example 8

The polymeric DL-β-phenylalanine used in Example 2 was dissolved in dichloracetic acid to form a 10 per cent solution and the solution was extruded at 20° centigrade into a bath of alcohol. The fibres so produced were withdrawn from the bath, pased through a drier and collected continuously.

Example 9

The copolymer used in Example 1 was dissolved in a mixture of 90 per cent of trichloracetic acid and 10 per cent of water to form a 10 per cent solution and the solution was extruded at 20° centigrade into a bath containing a mixture of equal volumes of water and ethyl alcohol. The fibres so produced were withdrawn from the bath, passed through a drier and collected continuously.

Example 10

The copolymer used in Example 1 was dissolved in a mixture of 75 per cent of trichloracetic acid and 25 per cent of dichloracetic acid to form a 10 per cent solution and the solution was extruded at 20° centigrade into a bath containing a mixture of equal volumes of water and methyl alcohol. The fibres so produced were withdrawn from the bath, passed through a drier and collected continuously.

Example 11

The copolymer of DL-valine and α-amino-isobutyric acid prepared as described in Example 5 of application Serial No. 159,392 was dissolved in formic acid to form a 15 per cent solution and the solution was extruded at 20° centigrade into a bath of water. The fibres so produced were withdrawn from the bath, passed through a drier and collected continuously.

Example 12

A polymer of DL-valine prepared by the method described in application Serial No. 159,392 using N-(aminoacetyl)-dimethylamine as initiator was dissolved in dichloracetic acid to form a 15 per cent solution and the solution was extruded at 20° centigrade into a bath of water. The fibres so produced were withdrawn from the bath, passed through a drier and collected continuously.

What we claim is:

1. A composition of matter comprising a spinning solution of a polypeptide in a liquid consisting of a mixture of dichloroacetic acid and trichloroacetic acid, said polypeptide being the reaction product of polymerizing at least one DL anhydrocarboxy alpha amino acid in solution, in the presence of an initiator having an active hydrogen atom, in a proportion such that the molecular ratio of initiator to anhydrocarboxyamino acid is one to at least 350.

2. A composition of matter comprising a spinning solution of a polypeptide in a liquid consisting essentially of trichloroacetic acid and a diluent in a proportion not exceeding 10% based on the weight of the liquid, said polypeptide being the reaction product of polymerizing at least one DL anhydrocarboxy alpha amino acid in solution, in the presence of an initiator having an active hydrogen atom, in a proportion such that the molecular ratio of initiator to anhydrocarboxyamino acid is one to at least 350.

3. A composition of matter as claimed in claim 2 in which the diluent is selected from the group consisting of water, benzene, and chloroform.

4. A composition of matter as claimed in claim 3 in which the diluent is water.

References Cited in the file of this patent

UNITED STATES PATENTS

| Number | Name | Date |
|---|---|---|
| 1,936,753 | Dreyfus et al. | Nov. 28, 1933 |
| 2,318,704 | Moncrieff et al. | May 11, 1943 |
| 2,516,162 | Tullock | July 25, 1950 |
| 2,540,855 | Tullock | Feb. 6, 1951 |
| 2,590,642 | Nichols | Mar. 25, 1952 |
| 2,592,447 | MacDonald | Apr. 8, 1952 |
| 2,598,372 | Hanby et al. | May 27, 1952 |
| 2,612,487 | Miegel | Sept. 30, 1952 |

FOREIGN PATENTS

| Number | Country | Date |
|---|---|---|
| 675,299 | Great Britain | July 9, 1952 |

OTHER REFERENCES

Bamford et al., Nature, October 29, 1949, No. 4174, pages 751 and 752.

Woodward et al., Journal Amer. Chem. Soc., vol. 69, June 1947, pp. 1551 and 1552.